United States Patent [19]

Jensen

[11] Patent Number: 5,185,541
[45] Date of Patent: Feb. 9, 1993

[54] GAS TURBINE FOR CONVERTING FUEL TO ELECTRICAL AND MECHANICAL ENERGY

[75] Inventor: Donald Jensen, West Palm Beach, Fla.

[73] Assignee: 21st Century Power & Light Corporation, Lantana, Fla.

[21] Appl. No.: 801,480

[22] Filed: Dec. 2, 1991

[51] Int. Cl.⁵ .............................................. H02K 44/00
[52] U.S. Cl. ......................................... 310/11; 310/10
[58] Field of Search ................. 310/10, 11; 415/10, 415/909; 290/52

[56] References Cited

U.S. PATENT DOCUMENTS

| | | | |
|---|---|---|---|
| 2,395,103 | 2/1946 | Clausen et al. | 110/1 |
| 2,483,780 | 10/1949 | Parmele | 110/23 |
| 3,039,406 | 6/1962 | Aref | 110/28 |
| 3,859,786 | 1/1975 | Azelborn et al. | 60/39.65 |
| 3,942,939 | 3/1976 | Matsumua et al. | 431/215 |
| 4,087,234 | 5/1978 | Delyannis | 431/168 |
| 4,565,137 | 1/1986 | Wright | 110/264 |
| 4,851,722 | 7/1989 | Zanderer | 310/11 |

FOREIGN PATENT DOCUMENTS

1501907 1/1970 Fed. Rep. of Germany .

Primary Examiner—Steven L. Stephan
Assistant Examiner—Judson H. Jones
Attorney, Agent, or Firm—Oltman and Flynn

[57] ABSTRACT

An energy converting apparatus is provided for converting liquid fuel to electrical and mechanical energy, including an exhaust chamber with external walls and an exhaust port; a gas turbine rotor in the exhaust chamber, with a central air inlet, a fuel inlet, a central exhaust gas inlet and a plurality of tangentially oriented gas ports. Air compressor means are provided for injecting air into the air inlet; fuel delivery means are provided for injecting fuel into the fuel inlet; an inwardly curved end wall in the exhaust chamber serves for receiving and reflecting exhaust gases ejected from the exhaust gas ports and maintaining an imploding vortex, wherein the imploding vortex is reflected back from the curved end wall. The imploding vortex forms electric charges on the external walls and the exhaust gases are ejected from the exhaust gas ports to turn the turbine rotor. Electrical take-off means are provided for taking off the electrical charges as electrical energy.

39 Claims, 7 Drawing Sheets

GAS TURBINE FOR CONVERTING FUEL TO ELECTRICAL AND MECHANICAL ENERGY

BACKGROUND AND PRIOR ART

The invention relates to apparatus for converting gaseous or liquid fuel energy to mechanical and/or electrical energy.

The apparatus is based on the observation by the inventor that a plasma formed of hot burning gases can be turned into a double vortex with one part of the vortex rotating in an outer cylindrical stratum of a rapidly rotating, axially moving plasma mass, which by suitable means as explained in more detail in the present disclosure, can be formed into a double vortex having an inner vortex rotating in a cylindrical stratum inside the aforesaid outer cylindrical stratum, and wherein the gas plasma in the inner vortex is rotating at considerably greater speed of rotation in the same rotational direction as the outer vortex, but in opposite axial direction. The process of turning the outer vortex into itself, so to speak, has been named a "sustained implosion", which term shall be used in the following description, which discloses energy converting apparatus based on the principle of sustained implosion technology.

To more readily understand the phenomenon of sustained implosion it should be understood that a sustained implosion is formed by injecting, by suitable means, hot burning gases into a cylindrical chamber, in the following termed an exhaust chamber, in such a manner that the burning, still expanding gases enter one end of the cylindrical exhaust chamber in an outer spiral-shaped trajectory following the inward facing surface of the chamber. The burning gases are reflected from an opposite suitably curved end wall of the chamber, to again traverse the chamber in an inner spiral-shaped trajectory moving axially in opposite direction of the outer trajectory. Due to the continued combustion of the burning gases, the temperature increases as gases keep expanding while at the same time the rotational speed of the gases increase considerably. Due to the high rotational velocity and the resulting radial gravity gradient, the hot burning plasma separates with its lighter particles concentrating at the axis of the exhaust chamber and the heavier particles at its perimeter. The separation of the lighter and heavier particles also create opposite electrical polarities resulting in an electric charge of one polarity forming on the cylindrical wall of the combustion chamber and an electrical charge of the opposite polarity forming on conducting structures disposed along the axis of the cylindrical wall. These charges can be tapped off by suitable conducting means and converted to usable electric power in a power converter.

The sustained implosion in the form of highly heated, high velocity imploding vortex combustion is further enhanced by ionizing the fuel within an ionizing chamber prior to combustion. The ionizing chamber is located at the center of the vortex. The combustion chamber is constructed so as to stratify all molecular and atomic particles by particle mass. The flow patterns operate to trap the heavier particles in the very hot pressure regions so as to force them into giving up their kinetic energy in their inertial mass before they escape from the system, and then to return these lighter gases to a low pressure in the central core that subsequently causes a repetition of the cycle. The plasma combustion produces great quantities of free electrons that associate and exchange within the highly heated stratified gas particles in such a manner so as to separate into particles of heavier masses and lighter masses, with the gases containing large quantities of ionized particles, including electrons and small quantities of ionized electrons, stratification by mass and polarization by orbit, and great variation of electrical potentials.

The technology of forming a vortex in a burning mass of gases for the purpose of more intimately mixing fuel and air in order to attain more complete combustion is per se known from the prior art. As examples, U.S. Pat. No. 4,507,075 shows a combustion device using vortex technology to improve the combustion of coal dust. U.S. Pat. No. 4,351,251 shows combustion apparatus with two oppositely moving vortices. U.S. Pat. No. 4,144,019 shows a vortex burner with two vortices separated by an intermediate cylindrical wall, and U.S. Pat. No. 3,958,915 shows a method of burning heavy oil in a two-stage combustion process with exhaust gas recirculation.

None of the prior art, however, shows the use of a double vortex, i.e. a sustained imploding vortex to generate electric energy, nor to be used as an adjunct to a gas turbine to enhance the efficiency of the turbine. It is accordingly an object of the instant invention to provide apparatus in the form of a gas turbine to produce electric energy and/or simultaneously produce shaft energy.

SUMMARY OF THE INVENTION

An energy converting apparatus is provided for converting liquid or gaseous fuel to electrical and mechanical energy, including an exhaust chamber with external walls and an exhaust port; one or more gas turbine rotors in the exhaust chamber, with a central air inlet, a fuel inlet, and a plurality of tangentially oriented exhaust cone ports. The exhaust gases from the exhaust cone ports are ejected into the exhaust chamber wherein they form a sustained spiral-shaped imploding vortex of swirling burning gases. Air compressor means are provided for supplying air into the air inlet; fuel delivery means are provided for supplying fuel into the fuel inlet; an inwardly curved end wall in the exhaust chamber serves for receiving and reflecting exhaust gases ejected from the exhaust gas ports and sustaining the imploding vortex. The imploding vortex is reflected back from the curved end wall as an inner spiral-shaped vortex. The imploding vortex forms electric charges on the external walls and the exhaust gases are ejected from the exhaust gas ports to turn the turbine rotor. Electrical take-off means are provided for taking off the electrical charges as electrical energy.

The energy converting apparatus according to the invention includes a fuel-air mixing chamber in the turbine rotor, which fluidly communicates with the central air inlet, the fuel inlet, and the exhaust gas inlet. A plurality of combustion chambers are fluidly communicating with the mixing chamber, a plurality of tangentially outward facing exhaust cones having inlets fluidly communicating with the combustion chambers, and combustion outlets terminating the exhaust cones. Electric ignition means are connected with the combustion chambers for igniting the fuel-air mixture in the combustion chambers.

The energy converting apparatus according to the invention further includes an electric ignitor in each combustion chamber and a spark generator coupled to the ignitor, in the ignition means.

The energy converting apparatus according to the invention may further include a hollow shaft coupling the air compressor means with the turbine rotor, the hollow shaft having a hollow interior fluidly coupling the air compressor means with the turbine rotor air inlet.

According to a further feature, the energy converting apparatus includes a planar end wall opposite the curved end wall in the exhaust chamber, an opening in the planar end wall for receiving the hollow shaft, and bearing means in the planar end wall for supporting the hollow shaft, and it may further include a shroud enclosing the exhaust chamber forming an air space between the shroud and the outer wall of the exhaust chamber; a plurality of air intake openings at one end of the shroud and a plurality of air outlet openings at an opposite end of the shroud; and air intake means in the air compressor means fluidly communicating with the air outlet openings. The air space operates to preheat air being drawn into the air intake means of the compressor means.

According to another feature, the energy converting apparatus includes a high-voltage converter having a high voltage input connected to the electric take-off means, a low-voltage output for delivering low voltage energy from the high-voltage converter, an electric motor having an electric input connected to the low-voltage output, an external motor shaft, and a rotating shaft connected to the holoow shaft via the compressor rotor for receiving rotary energy from the turbine rotor.

According to still another feature, the energy converting apparatus includes reduction gear means between the motor shaft and the rotating shaft for matching the rotary speeds of the rotating shaft and the motor shaft, a first electric insulator for electrically insulating the external walls of the exhaust chamber from the planar end wall, and a second electric insulator for insulating the external walls of the shroud from the exhaust port.

According to yet a further feature, the converting apparatus includes a liquid fuel line for supplying liquid fuel, a heat exchanger having an outlet connected to the liquid fuel line for converting the liquid fuel into vapor fuel, and an ionization chamber connected to the heat exchanger outlet for receiving the vapor fuel and ionizing the vapor fuel.

The energy converting apparatus according to the invention may further include a fuel injector connected to the ionization chamber, disposed in the fuel inlet of the turbine rotor for injecting vapor fuel into the mixing chamber, an electric heating element in the heat exchanger, the heating element including a porous metallic heating body, and electric connection means for connecting the porous heating body to an electric power source for vaporizing liquid fuel traversing said porous heating body.

The energy converting apparatus according to the invention includes a compressor rotor mounted on the rotating shaft, a compressor air inlet, a compressor air outlet fluidly communicating with the air inlet of the turbine rotor via the hollow shaft, a plurality of radially extending rotor blades on the compressor rotor for radially compressing air into the compressor air outlet. Or the compressor may have a plurality of inward slanted air scoops peripherally disposed on the compressor rotor for radially inwardly compressing air into the compressor air outlet, or alternatively a plurality of radially extending axially slanted rotor blades on the compressor rotor for axially compressing air into the compressor air outlet.

The invention further includes apparatus for implementing a method to preheat and to completely vaporize the incoming fuel by the use of a fuel ball located close to, or in the middle of the imploding exhaust chamber, and dispersing and intimately mixing a vaporized fuel into the power turbine rotor so as to premix it with the superheated air prior to delivery to individual combustion chambers located on the periphery of the rotor, and further to ionize the fuel and combustion air with a surplus of electrons produced by the plasma of the combustion cycle by insulating the exhaust chamber from the power turbine rotor.

The invention further includes apparatus and a method of preconditioning the fuel by superheating and ionizing the fuel and air molecules in such a manner as to cause the fuel to produce a much hotter combustion than is commonly produced in other systems, and producing a plasma combustion cycle by preheating and ionizing the fuel and combustion air and causing their molecules to oxidize and so react with each other within an imploding vortex cycle.

The invention further includes a method of delivering liquid fuel and/or preheated fuel with a conventional spray nozzle to a vacuum in the vortex center that will cause the fuel to flash into a vaporized steam by the principle that a liquid fuel, when sprayed into a vacuum will easily vaporized and will then immediately co-mingle with the preheated incoming air of the expanding vortex located within the power turbine disc.

The invention also includes apparatus and a method of sratifying by molecular and atomic weight the combusting fuel and exhaust molecules in such a manner as to cause the heavier and hotter reacting molecules to be progressively located at the outer periphery of the imploding vortex of the exhaust chamber and the lighter molecules and particles to progressively be located toward the center of the imploding vortex, wherein long chain molecules of a combusting air fuel mixture are stripped of their electrons by inducing a plasma from the combustion cycle, stratifying the electrons within the imploding electron gas that is produced by the plasma in such a manner that the lighter elements of the plasma exhaust are recycled by the use of slots, scoops or openings to the low pressure center of the power turbine rotor so as to reassociate these elements with the incoming fuel air mix. This causes a recycling of the combustion and reacting elements, causing a disassociation of the polluting elements normally associated with a combustion cycle. The method causes a very small quantity of exhaust gases to enter the atmosphere by communicating via an exhaust pipe to the imploding cyclonic exhaust chamber in such a manner as to encourage the positively charged vortexing exhaust elements to choose the negatively charged low pressure center of the imploding power turbine rotor as a path of least resistance. Tests completed with a supportive prototype have produced exhaust readings showing that combustion temperature in excess of 2400° F. could be attained. Measured exhaust readings were CO 75 PPM., $CO_2$ 23.5 ppm., $SO_2$ 0.02 ppm., $CH_x$ or general hydrocarbons were 0.12 ppm. There were no noticeable odors.

The very high temperatures produced from the plasma combustion are imparted to the imploding exhaust vortex chamber and other elements of the system by utilizing well known principles related to control of electron beams by magnetohydrodynamics technology, wherein electricity is produced from polarized high temperature combustion. When a surplus of randomly polarized particles is released in a combustion plasma cycle, very high temperatures are released that need to be controlled or mitigated so as to prevent excessive heat damage to the system. Within the disclosed system, this is achieved by electrically insulating the exhaust vortex chamber from the rest of the system. This chamber thereby becomes an anode, and the center of the power turbine rotor and fuel ball become a cathode. It is also recognized that a spinning disc, as well as a gas vortex is magnetically polarized.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

Figure 1:
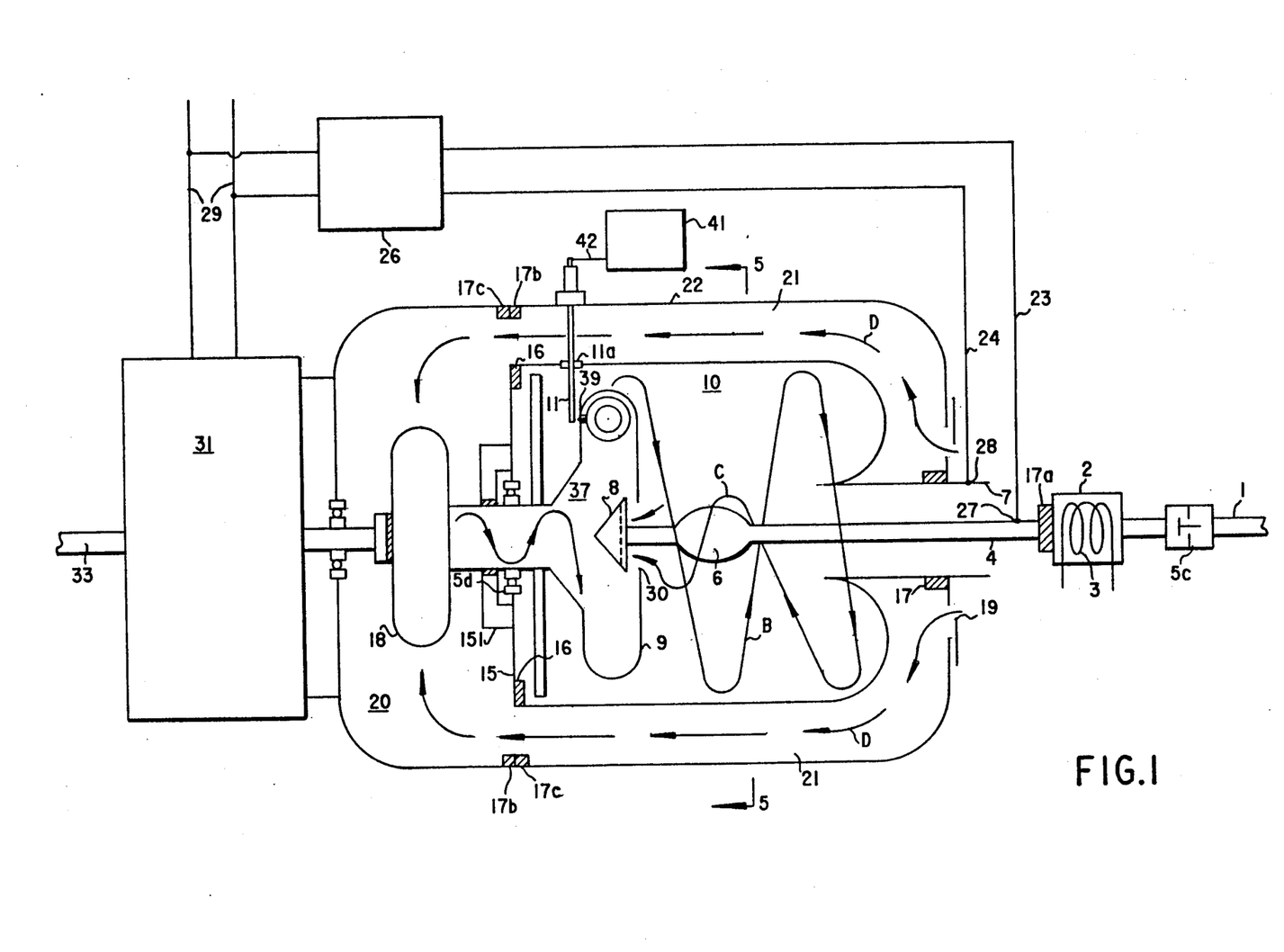
FIG. 1 is an elevational diagrammatic cross-sectional view of the invention showing its major components and air flow through the apparatus.

FIG. 1 is a diagrammatic cross-section of the gas turbine according to the invention.

Fuel in liquid form enters a liquid fuel intake line 1, passes through a one-way fuel valve 5c and through a heat exchanger 2 having a heating coil 3 or other suitable heat delivery component, which vaporizes the fuel, which enters through a vapor fuel line 4 an ionizing preheating chamber 6. The fuel line 4 is disposed inside an exhaust tube 7 disposed coaxially around the vapor fuel line 4 and rigidly supported in relation thereto. The vapor fuel enters the ionizing preheat chamber 6, and as it traverses the preheat chamber it becomes ionized as will be described in more detail later. The ionized vapor fuel next enters a fuel injector 8 disposed in a mixing chamber 37 in the center of a gas turbine rotor 9.

During operation the turbine rotor is rotating at a high rate of speed. Simultaneously, atmospheric air is transmitted into the mixing chamber 37 of the turbine rotor 9 through an air supply tube in the form of a hollow shaft 5 rigidly attached at its right hand end to the left hand side of the turbine rotor 9 and rotatably supported by a bearing 5d. At the left hand side the hollow shaft 5 is connected to the outlet of an air compressor 18 in a compressor chamber 20 drawing air from air intakes 19 at the right hand end of an exhaust chamber 10 as indicated by arrows D.

The air enters the mixing chamber 37 in the rotor 9 and is mixed with the vapor fuel in the rotor to form an intimately mixed combustible fuel-air mixture. The fuel-air mixture is ducted to a plurality of peripheral combustion chambers 34 (FIG. 3 and 3a) and ignited by an electric ignitor 11 disposed opposite the combustion chambers 34. Each combustion chamber is connected with a tangentially disposed combustion cone 36a which ejects the burning gases at high speed in a swirling clockwise (or counter clockwise) motion, as seen in direction of arrow B, into the exhaust chamber 10. The swirling burning gases ejected from the rotor 9 drive the rotor by the reaction of the ejected gases and continue to the right hand side in a spiral-shaped stream as indicated by arrow B along the inward facing cylindrical surface of the exhaust chamber 10, bounded by a cylindrical, high temperature resistant wall 12 having a right hand inward curved end wall 13, and an opposite left hand planar bearing support wall 15.

As the exhaust gases follow arrow B they form a sustained implosion as they leave the combustion cones 36, and are forced radially inward and reversed in axial direction by the curved end wall 13, to next follow a continued clockwise (or counter-clockwise) inner rotating vortex of a much smaller radius as indicated by the spiral-shaped arrow C. The inner part of the imploding vortex forms an extremely rapidly circularly rotating gas mass due to the small radius and the continued expansion of the hot gases axially moving in direction to the left.

The hot rapidly swirling gases form in this state a hot ionized gas plasma. Due to the rapid rotation, the plasma is stratified by the centrifugal force of the swirling gases so that it is separated with the lighter, electrically charged particles of the plasma drifting inward toward the central structures of the exhaust chamber 10, i.e. the fuel line 4, and ionization chamber 6, which become electrically charged to one polarity, while the heavier particles of the plasma of opposite polarity drift radially outward toward the outer wall 12 of the exhaust chamber 10, which becomes electrically charged to the opposite polarity. A circular insulator 16 between the planar end wall 15 and the exhaust chamber wall 12 and an inner circular insulator 17 between the exhaust tube 7 and shroud 22 provide electrical insulation between the inner structures and the cylindrical wall 12. A further circular electric insulator 17a insulates the vapor fuel line 4 from the heat exchanger 2. Two electric terminals 27 and 28 respectively connected to the fuel line 4 and to the exhaust tube 7 electrically connected to the inner wall 12, are wired by conductors 23, 24 to a high voltage converter 26, which converts the high voltage from terminals 27, 28 to a lower voltage usable to drive e.g. an electric motor 31 coupled by the rotating shaft 32 to both compressor 18 and further to the turbine rotor 9.

Two circular electric insulators 17b and 17c serve to insulate the planar wall 15 from outer shroud 22 to prevent electric conduction between the shroud 22 and wall 15. A circular electric insulator 17d between the compressor 18 and the rotating shaft 32 prevents electric conduction between shaft 32 and compressor 18.

The exhaust chamber 10 is surrounded by the shroud 22 that forms with the exhaust chamber wall 12 a cylindrical air space 21 with intake openings 19 which draw air as indicated by arrows D in a spiral formed path, created by obliquely positioned vanes (not shown) in the air space 21, to intake openings of the compressor 18, rotationally coupled by the hollow shaft 5 to the rotor 9 of the turbine. Due to the spiral shaped path of the air in intake air space 21, heat is effectively transmitted from the exhaust chamber 10 through the wall 12 to preheat the intake air in the air space 21.

On startup of the system, the electric motor 31 is connected via conductors 29 to an independent power source which turns the motor 31, mounted downstream of the gas turbine system, which subsequently turns the compressor 18 and the turbine rotor 9 to bring them up to starting speed. Once full operating speed has been reached the turbine rotor delivers rotational energy via rotating shaft 32 to an external mechanical load via motor shaft 33.

In accordance with one arrangement of the invention, part of the gases in the inner vortex indicated by arrow C reenter the turbine rotor 9 at a center opening 30 at the right hand side of the turbine rotor 9. Another part of burning gases in the inner vortex leaves the exhaust chamber 10 via the exhaust tube 7 in the form of exhaust gases which, due to the high temperature in the exhaust chamber 10, are broken down to the constituents of the air and fuel and consist mainly of water vapor, carbon dioxide, and nitrogen.

Figure 2:
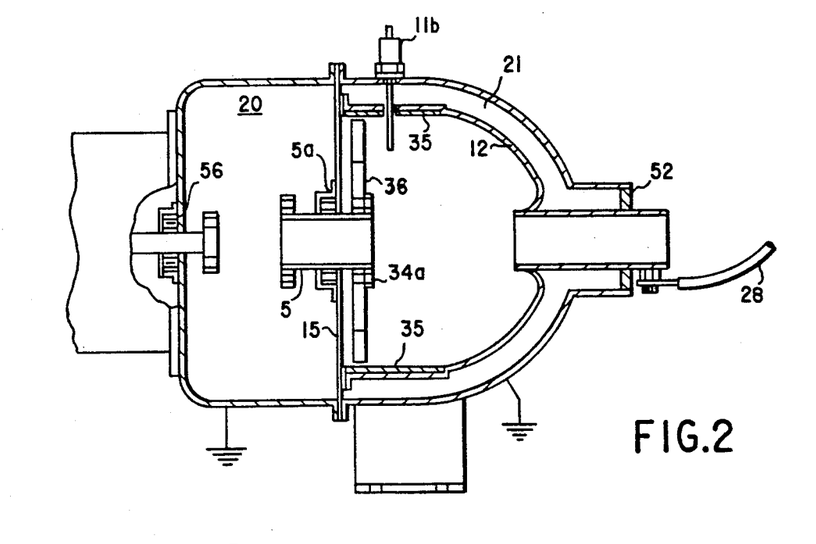
FIG. 2 is an elevational fragmentary view of the invention showing structural details of the exhaust chamber and the compressor chamber.

FIG. 2 is a cross-section of the fixed structures, including air supply hollow shaft 5, compressor chamber 20, the exhaust chamber 10, the intake air space 21 and other elements as described above. It additionally shows a wheel 36 connected to the air supply hollow shaft 5 by means of a flange 34a bolted to the wheel 36, which serves to protect the planar wall 15 from direct exposure to the hot gases in the exhaust chamber 10. It further shows a protective liner 35 which has an axially extended cross-section of a highly heat resistant material such as graphite, alumina, or other material which protects the exhaust chamber wall 12 against direct exposure to the exhaust gases from the turbine rotor 9. The wheel 36 also serves as a flywheel to even out rotational variations caused by fluctuations in the load on shaft 33.

Figure 3:
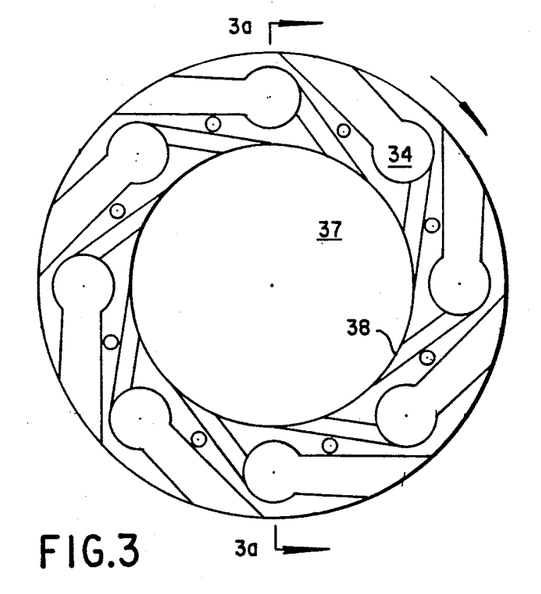
FIG. 3 is a plan diagrammatic view showing a section through one embodiment of the turbine rotor.

FIG. 3 is a plan view of the turbine rotor 9, showing a central mixing chamber 37 which serves to receive and mix vaporized fuel from fuel injector 8, compressed and preheated air from the air compressor 18 via hollow shaft 5 and, if applicable, partially combusted fuel-air gases entering via intake opening 30. The mixed fuel-air gases from the mixing chamber 37 flow through channels 38 into a number of peripherally positioned combustion chambers 34, wherein the fuel-air mixture is ignited by means of secondary ignitors 39 (FIG. 3a) which receive electric sparks from the primary ignitor 11 (FIG. 1) in the combustion chamber wall 12 and shroud 22, as described above, as the combustion chambers rotate past the primary ignitor 11, which receive high voltage from a spark generator 41 (FIG. 1) via conductor 42. It follows that one or more primary ignitors 11 may be provided to provide more frequent ignition in the combustion chambers 34. As the fuel-air mixture in the combustion chambers is ignited the ignited mixture rapidly expands and is ejected through expansion cones or chambers 36. The ejected, partially combusted exhaust gases impart a reaction force to the turbine rotor 9 as indicated by arrow E.

Figure 3A:
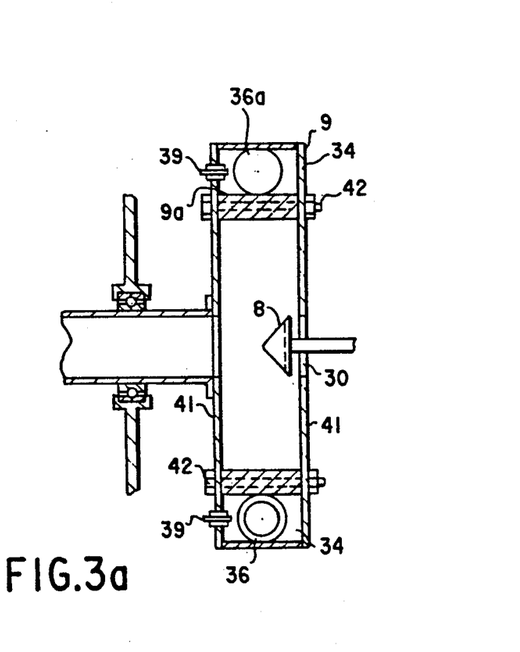
FIG. 3a is a cross-section of the turbine rotor seen along the line 3a—3a of FIG. 3.

It follows that the turbine rotor 9 can be constructed in different ways that would be obvious to a person of ordinary skills in the construction of high-temperature machine elements. Details of one construction mode is shown in FIG. 3a, which shows the rotor 9 constructed of a center core 9a as shown in FIG. 3a, and enclosed between two flanges 41 of high temperature alloy steel or the like. In another mode of construction seen in FIG. 8 the rotor 9 is made of two halfparts 9′,9″ with the mixing chamber 37, the combustion chambers 34 and the exhaust cones 36 formed into the two halfparts, which are joined by bolts 42 or rivets, welding or the like.

Figure 4:
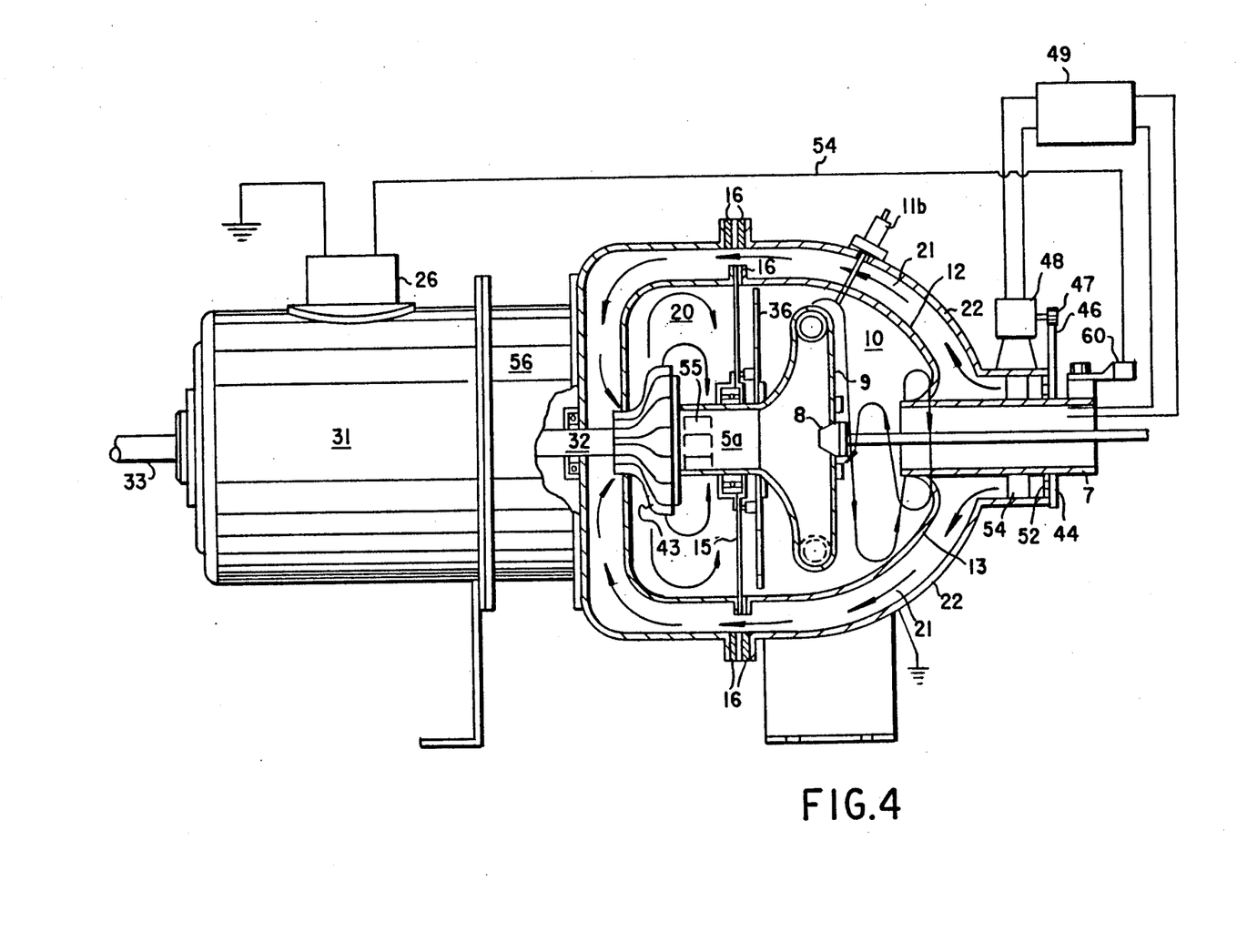
FIG. 4 is an elevational diagrammatic view of the invention showing compressor and other details.

FIG. 4 shows a construction of the invention, which has various features as described below. The compressor rotor is formed as having a plurality of radially extending rotor blades 43 disposed in a circle around the rotating shaft 32, and rotating inside a compressor chamber 20. The intake air is preheated in the intake air space 21, as described above, through controlled air intake openings 44 in a rotatable choke plate 46, which can be turned by a pinion 47 controlled by an electric motor 48, in turn controlled by an exhaust gas analyzer 49, having an exhaust gas sensor 51 in the exhaust tube 7. A fixed choke plate 52 has intake openings that can be aligned with corresponding intake openings in the rotatable choke plate 46 to admit the proper amount of intake air for a stoichiometrically correct fuel-air mixture. The exhaust gas analyzer 49 is conventional and well known from other engine types. The compressor rotor blades 43 compress the intake air into the compressor chamber 20, from where it enters the air supply hollow shaft 5a, which has in the end of the shaft positioned in the compressor chamber 20 a plurality of peripheral air scoops 55 projecting away from the hollow shaft 5a so that air forced into the shaft 5a is given an additional pressure boost for enhanced operation of the system. In the construction according to FIG. 4 the intake air space 21 extends past the planar wall 15 of the exhaust chamber 10, wherein the intake air is preheated as described above and passes through small air vanes (not shown) that impart further rotational movement to the intake air, which is opposite the direction of rotation of the compressor rotor 43 for maximum compressor efficiency. Insulating air vanes 54 are inserted in the forward part of the intake air space 21 to impart rotation to the intake air, as described above, for improved heat transfer from the exhaust chamber 10. Circular electric insulators 16 are inserted between the wall 12 of the exhaust chamber 10 and the planar exhaust chamber end wall 15. The electric charge deposited on the exhaust chamber walls 12 and 13 is taken off at an electrode 60 connected to the converter 26 via conductor 54a, while the other metallic structures are connected to common ground (GRD). Slanted electrically insulating vanes 54, as described above serve to insulate exhaust tube 7 from shroud 22.

The flywheel 36 described under FIG. 2 is also shown in FIG. 4. A reduction gear assembly 56 is shown interposed between the rotating shaft 32 and the electric motor 31, in order to match the rpm of the turbine with the rpm of the motor 31 if necessary.

Figure 5:
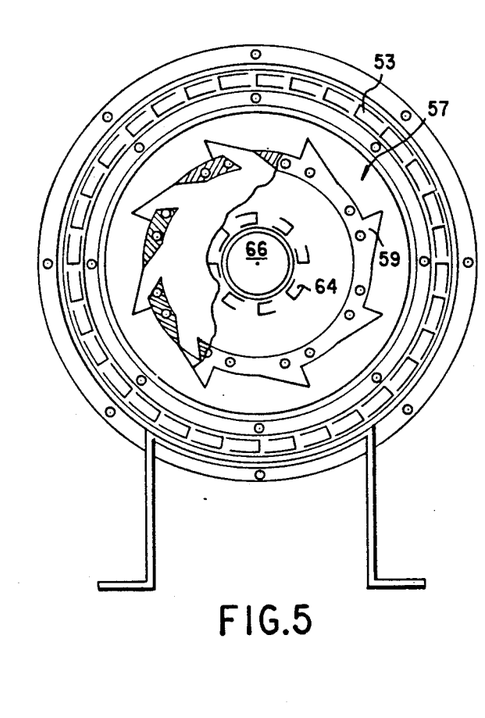
FIG. 5 is an elevational diagrammatic cross-sectional view of the invention seen along the line 5—5 of FIG. 1 and 6 showing details of the internal construction.
Figure 6:
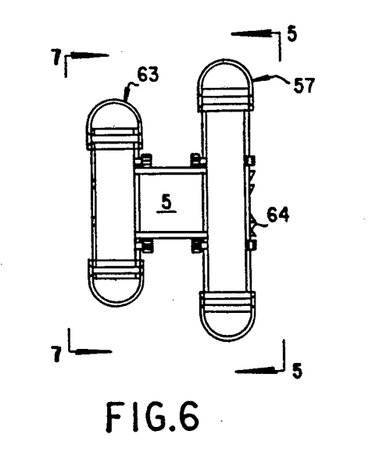
FIG. 6 is an elevational diagrammatic cross-sectional view of the invention showing a section through the compressor rotor, the turbine rotor and the connecting hollow shaft.
Figure 7:
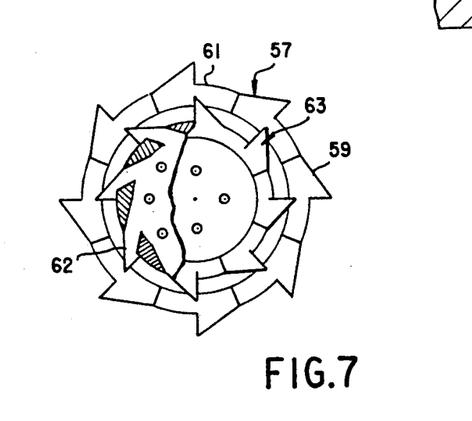
FIG. 7 is an elevational plan diagrammatic view seen along the line 7—7 of FIG. 6 showing details of the compressor and turbine rotors.
Figure 7A:
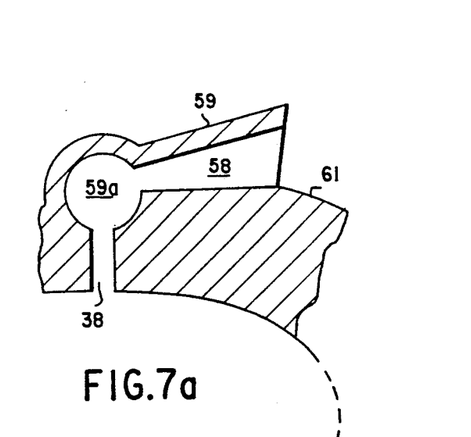
FIG. 7a is a fragmentary detail section of the turbine rotor according to FIG. 3.

FIGS. 5, 6 and 7 and 7a show still another construction of the turbine rotor and compressor rotor, wherein the turbine rotor 57 has exhaust cones 59 that extend beyond the perimeter 61 of the turbine rotor 57, as shown in the fragmentary detail FIG. 7a, wherein the mixing chamber 37 is connected via channel 38 with the combustion chamber 59a, wherein the fuel-air mixture is ignited as described under FIG. 3a. The turbine rotor in this construction is more efficient because the expansion exhaust cone or chamber 58 is longer and more tangentially expelling the exhaust gases. The compressor rotor 63 (FIG. 7) seen along the line 7—7 of FIG. 6 is provided with intake scoops 62 (FIG. 7) which help to increase the compressed air pressure delivered to the turbine rotor as described above.

The turbine rotor described above is a radial rotor of the reaction type wherein the rotating moment is derived from the reaction of the ejected gases that exit the rotor in a radial plane. It follows that the rotor could be arranged with the expansion cones ejecting the exhaust gases in direction having one axial component and another component tangential to the perimeter of the rotor. It also follows that more than one turbine rotor could be mounted on a common shaft for generation of increased power, as is known from conventional gas turbines.

FIG. 6 is an edge view of the compressor rotor 63 and the turbine rotor 57, according to FIGS. 5 and 7 respectively.

FIG. 5 is a plan view of turbine rotor 57, seen along the line 5—5 of FIG. 6, which shows the projecting exhaust cones 59, and a plurality of circularly disposed exhaust intake scoops 64 on the side of the turbine rotor 57, which are placed in a circle around the lead-in opening 66 for the fuel injector 8 (FIG. 4). The exhaust gas intake scoops 64 lead into a central mixing chamber 37 (FIG. 7a) corresponding to the mixing chamber 37 of the turbine rotor 9 in FIG. 1. The exhaust gas intake scoops 64 are also seen in the edge view of FIG. 6.

FIG. 7a shows details of the turbine rotor 57 in FIGS. 5 and 7, which include a channel 38 from mixing chamber 37 leading into each combustion chamber 59, in turn connected with an expansion exhaust cone outlet 58.

Figures 8, 8A:
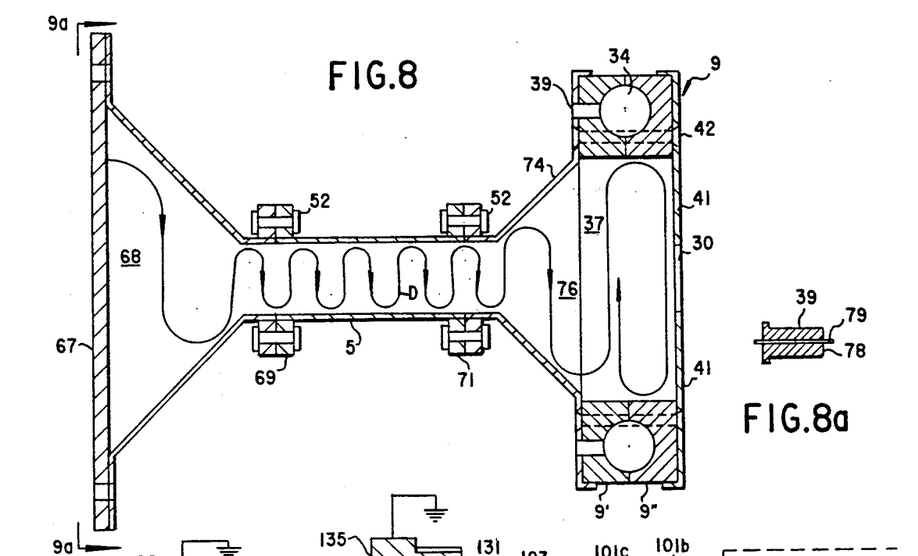
FIG. 8 is an elevational diagrammatic cross-sectional detail view showing details of an embodiment of a compressor and turbine rotor.
FIG. 8a is an elevational diagrammatic cross-sectional fragmentary view showing an ignitor unit.
Figure 9A:
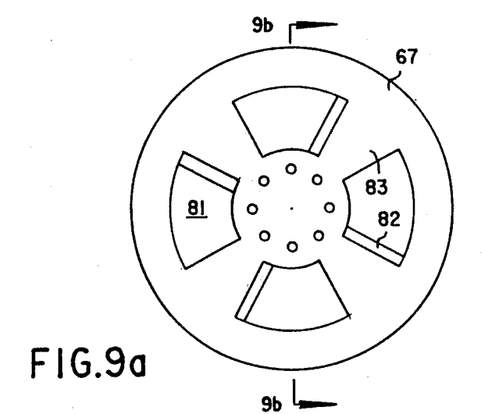
FIG. 9a is a plan diagrammatic view seen along the line 9a—9a of FIG. 8 showing a compressor rotor according to the axial compression mode.

FIG. 8 is a sectional view showing a compressor rotor 67 mounted on a conical flange forming an intake cone 68 attached to the hollow shaft 5, which are joined by two flanges 69, 71, connected by bolts or rivets 52. The turbine rotor 9 is formed of two halfparts 9′, 9″ of heat resistant material as described above, and joined by an outer flange plate 41 and an inner flange 74, partially formed as a cone which forms with a central part 37 of the turbine rotor an extended mixing chamber 76, which leads to a plurality of combustion chambers 34 through channels, not seen in the figure, but are similar to the channels 38, seen in FIG. 3. The combustion chambers 34 lead to the tangentially oriented expansion exhaust cones 59, not seen in the figure, but similar to the expansion exhaust cones 36 shown in FIG. 3. The two turbine rotor halfparts 9′ and 9″ and the flanges 41, 74 are held together by rivets, or bolts 42 or the like. A secondary ignitor 39 is seen connected with each combustion chamber 34 as shown above. The secondary ignitor 39 has, as shown in more detail in FIG. 8a, an insulator 78 and a center electrode 79. The compressor rotor 67 has intake openings 81, as seen in FIG. 9a, having slanted edges 82 that operate to draw air into the intake cone 68.

It follows that the compressor rotor 67 can be formed in several ways. For example, the arms, i.e. spokes 83 (FIG. 9a), between the intake openings 81 can be formed as slanted blades, as known from conventional axial compressors. It also follows that several rotors can be provided in a tandem configuration as known from high pressure axial compressors. Another compressor rotor, seen in FIGS. 10a and 10b has a rotor face plate 84 with radially oriented intake scoops 86, and a cylindrical portion 87 with axially oriented intake scoops 88, again leading into a conical intake chamber 68, wherein the air being compressed forms a vortex as indicated by arrow D in FIG. 8.

Figures 9B, 10B, 10C, 11, 12:
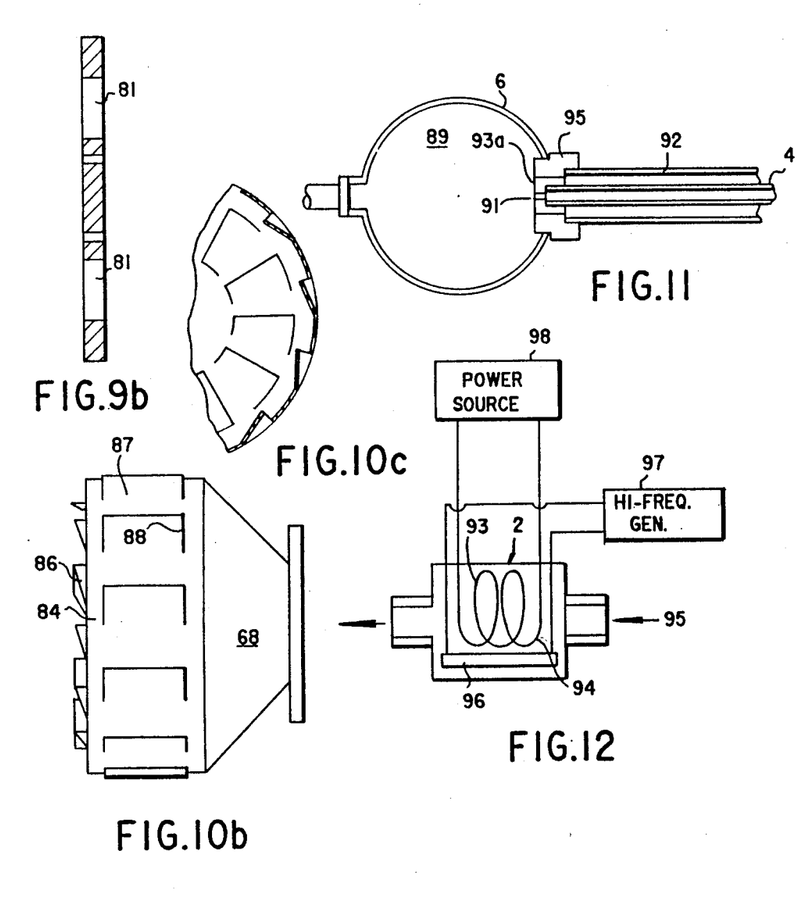
FIG. 9b is a diagrammatic cross-sectional view seen along the line 9b—9b of FIG. 9a showing an edge view of a compressor rotor according to the axial compression mode.
FIG. 10b is an elevational diagrammatic view seen along the line 10b—10b of FIG. 10a showing the compressor rotor according to the combined axial and radial compression mode.
FIG. 11 is a cross-section of one version of the ionizing chamber.
FIG. 12 is a diagrammatic cross-sectional view showing a heat exchanger with a transducer.
Figure 10A:
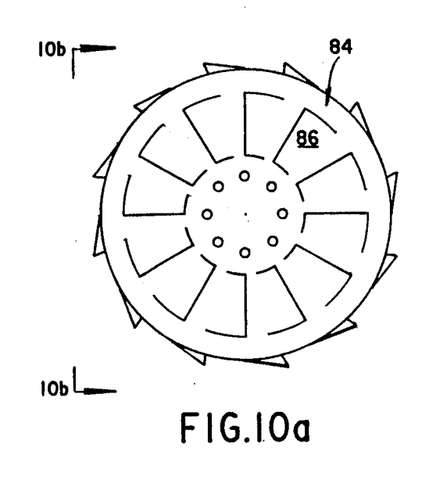
FIG. 10a is a plan diagrammatic view showing a compressor rotor according to a combined axial and radial compression mode.

An ionizing preheating fuel chamber, seen in FIG. 1 with reference numeral 6, is shown in more detail in FIG. 11, wherein a spherical heating chamber 89 has a vaporized fuel intake line 4 leading into the spherical chamber 89 through an injection orifice 91 that distributes the injected vaporized fuel. Another tubular line 92 surrounds the fuel line 4 and serves to inject a combustion catalyzing agent, through orifices 93 so that a small amount of liquid catalyst is mixed into the fuel vapors in the spherical chamber 89 before the catalyzed mixture is injected into the mixing chamber 37 of the turbine rotor 9 (FIG. 1). The orifices 91, 93a are formed in a body 95 supporting the ends of fuel line 4 and the tubular line 92. A heat exchanger 2 (FIG. 1) is shown in FIG. 12, wherein liquid fuel enters at fuel inlet 95, traverses a heat transfer chamber 93, wherein the fuel is receiving an initial preheating by means of a heating coil 94 which vaporizes the fuel. In order to accelerate the preheating process, a vibrating transducer 96 is advantageously inserted into the heat transfer chamber 93 which sets the liquid fuel in vibrating motion that enhances heat transfer from the heating element 94. The transducer 96 is advantageously of the piezo-electric type. The transducer 96 is connected to a high-frequency generator 97. The heating coil 94 can be an electric heating element connected to an electric power source 98.

Figure 13:
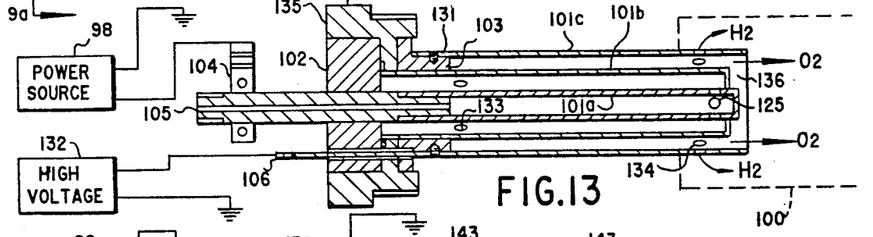
FIG. 13 is a diagrammatic cross-sectional view showing a heat exchanger composed of multiple coaxial tube sections and an electrolysis electrode.
Figure 14:
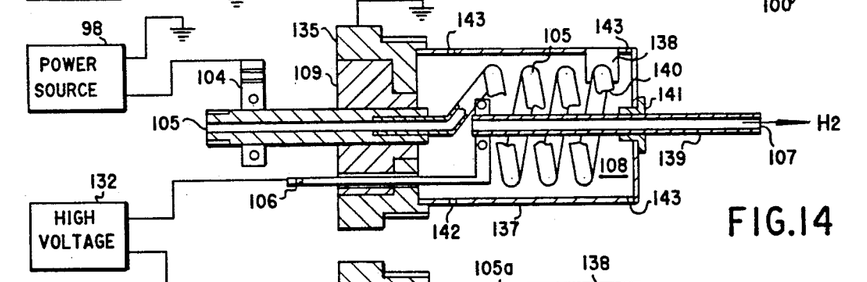
FIG. 14 is a diagrammatic cross-sectional view showing a heat exchanger with a coiled tubular heating element and an electrolysis electrode.
Figure 15:
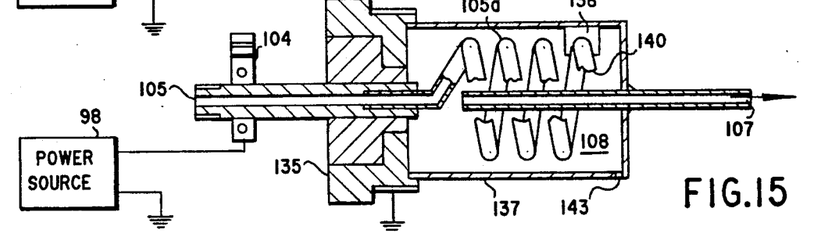
FIG. 15 is a diagrammatic cross-sectional view showing a heat exchanger with a coiled tubular heating element having its one electrical connection returned to ground potential.

Other forms of heat exchange devices are shown in FIGS. 13, 14 and 15. In FIG. 13 concentric metallic tubular heating elements 101a and 101b are connected via terminal 104 and common ground GRD to an electric power source 98 (FIG. 12), and is traversed by liquid fuel entering at inlet 105 and being vaporized by contact with the electrically heated tubular elements 101a and 101b connected by apertures 125 in tubular element 101a. The tubular elements 101a and 101b are separated at one end by means of an electric insulator 102 to prevent short circuit between the elements, as electric power is connected to electrodes 104 and ground GRD. An external tubular element 101c is electrically insulated at its left hand end 131 at insulator 103 supported in a metallic body 135, and is connected via a terminal 106 to a negative pole of a high voltage power supply 132, which causes an electrostatic field to be formed between tubular elements 101c and 101b, which operates to ionize by electrolysis the fuel vapors exiting via apertures 133 in tubular element 101b. Due to electrolysis the fuel vapors are separated into negative and positive ions, including oxygen molecules exiting at exit 136 and hydrogen fuel particles exiting at apertures 134. The entire mixture of positive and negative ions and molecules is ducted by ducting means 100, shown in phantom lines, into the fuel vapors line 4 from where it proceeds via ionizing chamber 6 to the mixing chamber 37 in the turbine rotor 9 as described above.

Another electrolyzing heat exchanger is shown in FIG. 14, wherein liquid fuel enters at fuel inlet 105, and traverses a coiled tubular heating element 105a to emerge as vapor fuel at coiled tube exit 140, from where it enters an electrolyzing chamber 108 formed by an outer tubular element 137. The outer tubular element 137 is connected to ground GRD via a metallic body 135 supporting the left hand end of tubular element 137. The left hand end of coiled tube element 105a is connected to a terminal 104 connected to one pole of a power source 98, as also shown in FIGS. 12 and 13, having its other pole connected to common ground GRD. A heating current flows from power source 98 through the coiled tubular element 105a, via metallic connection 138, through outer tubular element 137 via metallic body 135 to common ground GRD, which vaporizes the liquid fuel traversing coiled tubular element 105a. The vapor fuel in chamber 108 is exposed to an electrolyzing electric field formed by a high voltage source 132 connected to terminal 106, in turn connected to a central tubular element 139 insulated from the end wall 142 of vapor chamber 108 by an insulator 141. The vapor fuel in chamber 108 is electrolyzed into hydrogen atoms which exit via exit 107 of the central tubular element 139 and oxygen atoms $O_2$ which exit via apertures 143 and 142 in the tubular element 137. As described above under FIG. 13, the fuel molecules and hydroogen and oxygen atoms are ducted to the vapor fuel line 4 by suitable ducting means.

A non-electrolyzing heat exchanger is shown in FIG. 15, constructed along the lines shown in FIG. 14, except no high voltage field is provided, but only a coiled tubular heating element 105a traversed by fuel entering a liquid fuel inlet 105 and vaporized in heating element 105a to exit as vapor fuel at vapor exit 140. Heating power is provided by electric power source 98, having one pole connected via terminal 104 to one end of the coiled tubular element 105a, and the other pole to common ground GRD. A weeping hole 143 in the outer tubular element 137 allows condensed fuel vapors to escape from the chamber 108, and vapor fuel exits at vapor fuel outlet 107 ducted to vapor fuel line 4.

The tubular element 101c in FIG. 13 and the central tubular element 139 in FIG. 14 acting as electrolyzing electrodes may advantageously be made of thin-walled tubing stock of palladium, platinum, iron cobalt or nickel. These metals and any other metals capable of catalyzing the hydrogenation of the fuel vapors are known to enhance the process of catalyzing the hydrogenation process. Especially palladium is known to be an active catalyzer, and platinum is known to initiate low temperature oxidation. Alternatively the inner surfaces of the heat exchangers which are in contact with fuel vapors may be thinly plated with the aforesaid metals.

The ionizing chamber 6 shown in FIG. 1 is advantageously close to or in the center of the exhaust chamber 10 in the form of a fuel ball.

Figure 17:
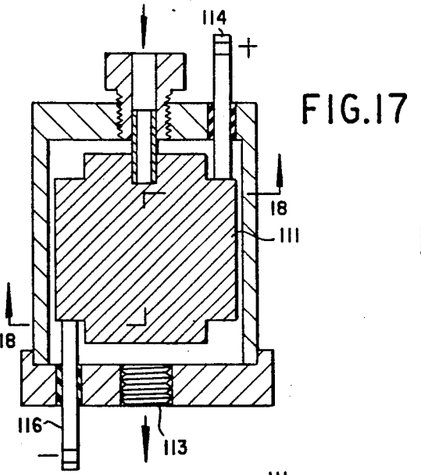
FIG. 17 is a diagrammatic cross-sectional view showing an embodiment of the heat exchanger having a porous metal heating element.
Figure 18:
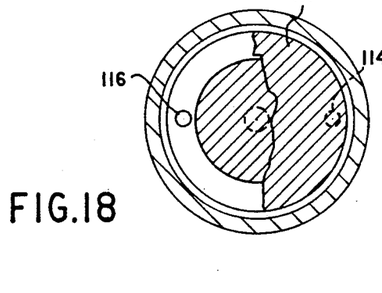
FIG. 18 is a diagrammatic cross-sectional view seen along the line 18—18 of FIG. 17 showing the porous metal heating element.

Further heat exchanger configurations suitable for greater fuel flow-through conditions are shown in FIGS. 17, 18 and 19, 20 wherein FIGS. 17 and 18 show cross-sections of a heat exchanger having a core 111 of porous metal connected between a liquid fuel inlet 112 and a fuel vapor outlet 113, and wherein electric terminals 114 and 116 serve to apply an electric current through the porous core 111, which heats the core to vaporize the fuel. FIG. 18 is a cross-section seen along line 18—18 in FIG. 17, showing terminal 116 in full lines, and terminal 114 in phantom lines.

Figure 19:
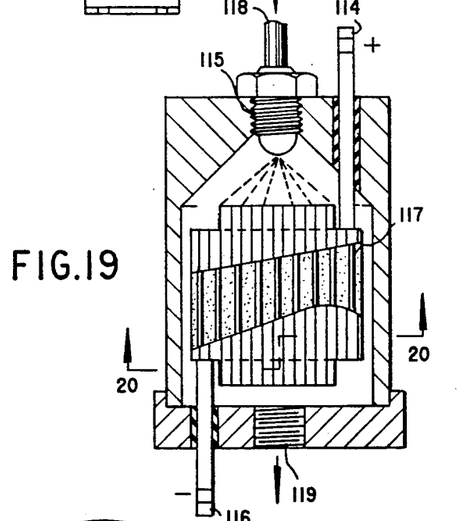
FIG. 19 is a diagrammatic cross-sectional view showing an embodiment of the heat exchanger having a honeycomb metal thin wall heating element.
Figure 20:
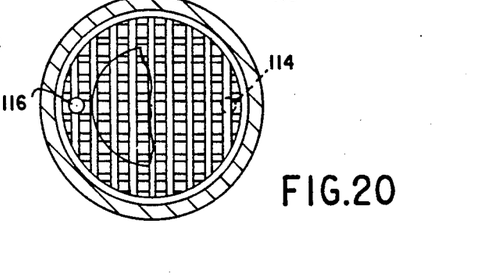
FIG. 20 is a diagrammatic cross-sectional view showing the honeycomb metal heating element.

A heat exchanger of similar construction, but provided with a reticulated honeycomb core 117 instead of the porous core 111 is shown in FIGS. 19 and 20, wherein liquid fuel enters at fuel inlet 118 and is atomized in a fuel nozzle 115, and vaporized fuel exits at fuel vapor exit 119.

FIG. 20 is a cross-section of the core 117 seen along the line 20—20 in FIG. 19.

Figure 16:
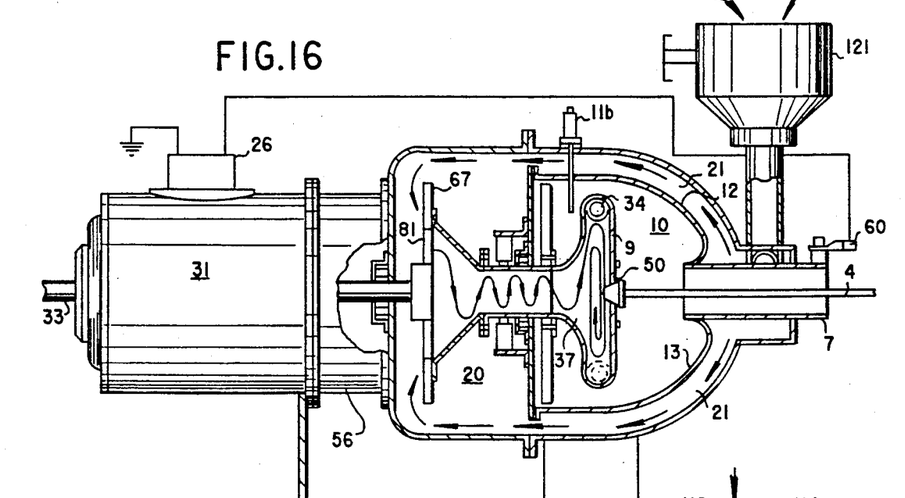
FIG. 16 is an elevational cross-sectional view of the invention in an embodiment having the compressor air outlet injecting air from the air intake side of the air space between the exhaust chamber and the shroud.

FIG. 16 shows a version of the invention wherein an externally driven external compressor 121 injects air at the right hand end of air space 21, where it is preheated by contact with the wall 12 of the combustion chamber 10, as also shown in FIG. 1 and next enters the internal compressor intakes 81. The operation of the version according to FIG. 16 is in all other respects as described in connection with FIGS. 4 and 8.

The following section provides some additional clarifying information to the operation of the apparatus above.

The disclosed apparatus serves for combusting fuel by means of a so-called sustained imploding vortex applied to a super-heated, high velocity imploding power plasma turbine. It was discovered that when such a system was properly understood and utilized, it provided a very unique method of maximizing the liberation of energy from all forms of gas or liquid fuels. This invention also utilizes a discovered technology whereby the fuel is super preheated so as to make it chemically and molecularly very active and encases this preheated fuel into an electrically insulated ionizing chamber containing large amounts of free electrons. By actual prototype test results, these electrons are believed to attach themselves to the activated fuel molecules, causing the fuel to become ionized and behave as a gas plasma within the power turbine. The plasma greatly increases the combustion temperature which further increases the potential energy in the plasma. Diesel oil that normally burns at 1200° F. in present systems has a combustion temperature in excess of 2400° F. in a prototype model of the imploding vortex. The flow patterns within this vortex are of extreme importance as they create the sustained implosion within the plasma power turbine and the exhaust chamber. The system is designed to duplicate and to maximize the energy in the imploding vortex.

The imploding vortex is a stratified system of swirling gases, wherein the heavier gas masses become progressively stratified along the outer perimeter of the vortex and the lighter masses become progressively stratified around the central core. The pressure in the vortex is greater near the outer perimeter of the confining chamber and lighter near the central axis of the vortex due to the gravity gradient created by the mass and circular motion of the combusting particles. At the center of the combustion vortex the velocity is very high and the temperature is cool when compared to the condition at its periphery. The disclosed invention utilizes all of the peculiar characteristics of the imploding vortex to its advantage so as to increase thermal efficiency and to reduce polluting emissions normally associated with hydrocarbon fuel combustion.

The swirling electrically charged gas particles in the sustained imploding vortex generate a strong magnetic field in the vortex which further aids in stratifying the gases in the inner and outer vortex, which in turn leads to the separation of oppositely charged gas particles in separate layers.

I claim:

1. An energy converting apparatus for converting liquid or gaseous fuel to at least one of electrical and mechanical energy, comprising an exhaust chamber having an outer wall and an exhaust port connected with an exhaust tube; a gas turbine rotor in said exhaust chamber, having a central air inlet, a fuel inlet, a plurality of tangentially oriented exhaust cones for ejecting exhaust gas; air compressor means for supplying air into said air inlet; fuel delivery means for supplying fuel into said fuel inlet; an inwardly curved end wall in said exhaust chamber for receiving and reflecting exhaust gases ejected from said exhaust gas outlet ports and sustaining a sustained imploding vortex formed by said exhaust gas, said imploding vortex being reflected back to said gas turbine rotor; said sustained imploding vortex forming a gas plasma depositing electric charges on said outer wall and said fuel delivery means; said exhaust gases being ejected from said exhaust cones turning said turbine rotor; part of said exhaust gas exiting via said exhaust tube; and further including electrical take-off means for taking off said electrical charges as electrical energy.

2. An energy converting apparatus according to claim 1, including a fuel-air mixing chamber in said turbine rotor fluidly communicating with said central air inlet; a plurality of combustion chambers fluidly communicating with said mixing chamber, said plurality of exhaust cones having exhaust cone inlets fluidly communicating with said combustion chambers; and electric ignition means connected with said combustion chambers for igniting said fuel-air mixture in said combustion chambers.

3. An energy converting apparatus according to claim 2, including an electric ignitor in each of said combustion chambers and a spark generator coupled to said ignitor, in said ignition means.

4. An energy converting apparatus according to claim 1, including a hollow shaft coupling said air compressor means with said turbine rotor, said hollow shaft having a hollow interior fluidly coupling said air compressor means with said turbine rotor air inlet.

5. An ennergy converting apparatus according to claim 4 including a planar end wall in said exhaust chamber opposite said curved end wall, an opening in said planar end wall for receiving said hollow shaft, and bearing means in said planar end wall for supporting said hollow shaft.

6. An energy converting apparatus according to claim 1 including a shroud enclosing said exhaust chamber forming an air space between said shroud and said outer wall of said exhaust chamber; at least one air intake opening at one end of said shroud and at least one air outlet opening at an opposite end of said shroud, and air intake means in said air compressor means fluidly communicating with said air outlet opening, said air space operating to preheat air being drawn into said air intake means of said compressor means.

7. An energy converting apparatus according to claim 1, including a high-voltage converter having a high voltage input connected to said electric take-off means, and a low-voltage output for delivering low voltage energy from said high-voltage converter.

8. An energy converting apparatus according to claim 7 including a rotating shaft connected to said compressor rotor, an electric motor having an electric input connected to said low-voltage output, and a motor shaft connected to said rotating shaft for receiving rotary energy from said turbine rotor.

9. An energy converting apparatus according to claim 8 including reduction gear means between said motor shaft and said rotating shaft for matching the rotary speeds of said rotating shaft and said motor shaft.

10. An energy converting apparatus according to claim 6, including first electric insulating means for electrically insulating said outer wall of said exhaust chamber from said planar end wall.

11. An energy converting apparatus according to claim 10, including a first circular insulator in said first electric insulating means disposed between said outer wall and said planar end wall.

12. An energy converting apparatus according to claim 6, including second electric insulating means for insulating said outer wall of said exhaust chamber from said shroud.

13. An energy converting apparatus according to claim 12, including a second circular insulator in said second electric insulating means.

14. An energy converting apparatus according to claim 1, including a liquid fuel line for supplying liquid fuel, and a heat exchanger an outlet connected to said liquid fuel line for converting said liquid fuel into vapor fuel.

15. An energy converting apparatus according to claim 14, including an ionization chamber connected to said heat exchanger outlet for receiving said vapor fuel and ionizing said vapor fuel.

16. An energy converting apparatus according to claim 15, including a fuel injector connected to said ionization chamber, disposed in said fuel inlet of said turbine rotor for injecting said vapor fuel into said mixing chamber.

17. An energy converting apparatus according to claim 14 including an electric heating element in said heat exchanger, said heating element including a porous metallic heating body, and electric connection means for connecting said porous heating body to an electric power source for vaporizing liquid fuel traversing said porous heating body.

18. An energy converting apparatus according to claim 14 including an electric heating coil in said heat exchanger for vaporizing liquid fuel traversing said heat exchanger.

19. An energy converting apparatus according to claim 14 including an electric heating element in said heat exchanger, said heating element including a metallic honeycombed heating body having a reticulated cross-section, and electric connection means for connecting said honeycombed heating body to an electric power source for vaporizing liquid fuel traversing said honeycombed heating body.

20. An energy converting apparatus according to claim 14 including a vibrating transducer in said heat exchanger, and electric connection means for connecting said vibrating transducer to a high frequency power source for stimulating vaporization of said liquid fuel traversing said heat exchanger.

21. An energy converting apparatus according to claim 14 including first, second and third concentric tubular elements in said heat exchanger, electric connecting means for connecting an electric power source to said first and second tubular heating elements for vaporizing liquid fuel into vapor fuel traversing said first and second tubular elements, said third tubular element enclosing said first and second tubular elements, and a high voltage source connected to said third tubular element for electrolyzing said vapor fuel.

22. An energy converting apparatus according to claim 14 including a coiled tubular heating element in said heat exchanger and electric connecting means for connecting an electric power source to said coiled tubular heating element for vaporizing liquid fuel into vapor fuel traversing said coiled tubular heating element, a tubular chamber enclosing said coiled tubular heating element, a tubular electrode centrally disposed in said tubular chamber forming a vapor fuel outlet from said tubular chamber, and a high voltage source connected to said tubular electrode for electrolyzing said vapor fuel.

23. An energy converting apparatus according to claim 21, wherein one of said tubular elements is a catalytic agent injection element for injecting a catalytic agent into said vapor fuel for stimulating combustion of said vapor fuel.

24. An energy converting apparatus according to claim 4, including a compressor rotor in said air compressor means mounted on said hollow shaft, a compressor air inlet and a compressor air outlet fluidly communicating with said air inlet of said turbine rotor via said hollow shaft.

25. An energy converting apparatus according to claim 24, including a plurality of radially extending rotor blades on said compressor rotor for radially compressing air into said compressor air outlet.

26. An energy converter apparatus according to claim 24 including a plurality of inward slanted air scoops peripherally disposed on said compressor rotor for radially inwardly compressing air into said compressor air outlet.

27. An energy converter apparatus according to claim 24, including a plurality of radially extending axially slanted rotor blades on said compressor rotor for axially compressing air into said compressor air outlet.

28. An energy converting apparatus according to claim 27 including a funnel-shaped chamber in said compressor means having an axis coextensive with an axis of said rotating shaft, and a wide end mounting said compressor rotor and a narrow end attached to said hollow shaft, said funnel-shaped chamber operating to form an imploding vortex of compressed air entering said hollow shaft.

29. An energy converting apparatus according to claim 6 including adjustable choke means in said plurality of air intake openings for adjusting air flow through said air intake openings to match fuel flow in said fuel delivery means.

30. An energy converting apparatus according to claim 29, including an exhaust gas analyzer coupled to said exhaust tube, and servomotor means having a control input coupled to said exhaust gas analyzer and output drive means coupled to said choke for automatically adjusting said air flow to match fuel flow in said fuel delivery means.

31. An energy converting apparatus according to claim 6, including slanted input vanes in said plurality of air intake openings for inducing circular air flow in said air space.

32. An energy converting apparatus according to claim 6, including a compressor chamber for housing said compressor means, and a plurality of slanted vanes in said air outlet openings for inducing circular air flow in said compressor chamber.

33. An energy converting apparatus according to claim 1, including an external air compressor in said compressor means, a compressor outlet of said external air compressor fluidly communicating with said central air inlet of said turbine rotor.

34. An energy converting apparatus according to claim 33, including a shroud surrounding said exhaust chamber forming an air space having an air space inlet connected with said external compressor outlet, and an air space outlet connected with said central air inlet.

35. An energy converting apparatus according to claim 33, including a plurality of tandem-connected compressor rotors in said compressor means, a first rotor in said plurality of rotors connected with said air space outlet and a last rotor connected with said central air inlet.

36. An energy converting apparatus according to claim 6 including slanted vanes in said air space for forming helical air flow in said air space.

37. An energy converting apparatus according to claim 1 including a heat protective liner inside said outer wall for protecting said wall against exhaust heating from said turbine rotor.

38. An energy converting apparatus according to claim 1 including a centrally located exhaust gas inlet in said turbine rotor for recirculating part of said exhaust gas in said exhaust chamber.

39. An energy converting apparatus according to claim 5 including an electric brush attached to said planar wall, in electrical conductive engagement with said hollow shaft for bypassing electric current flow to said bearing means.

* * * * *